United States Patent US 9,260,955 B2
Stehle et al. (45) Date of Patent: Feb. 16, 2016

(54) METHOD OF REDUCING ZONE PERMEABILITY BY IN-SITU FORMATION GEL OF UROTROPIN AND UREA IN AN AQUEOUS SOLUTION

(75) Inventors: Vladimir Stehle, Kassel (DE); Konrad Siemer, Kassel (DE); Liubov Altunina, Tomsk (RU); Vladimir Kuvshinov, Tomsk (RU); Ivan Kuvshinov, Tomsk (RU)

(73) Assignees: Institute of Petroleum Chemistry of the Siberian Branch of the Russian Academy of Sciences, Tomsk (RU); Wintershall Holding GmbH, Kassel (DE)

(*) Notice: Subject to any disclaimer, the term of this patent is extended or adjusted under 35 U.S.C. 154(b) by 219 days.

(21) Appl. No.: 13/606,332

(22) Filed: Sep. 7, 2012

(65) Prior Publication Data

US 2013/0062078 A1 Mar. 14, 2013

Related U.S. Application Data

(60) Provisional application No. 61/532,126, filed on Sep. 8, 2011.

(51) Int. Cl.
*E21B 43/22* (2006.01)
*E21B 43/20* (2006.01)
*C09K 8/58* (2006.01)

(52) U.S. Cl.
CPC .. *E21B 43/20* (2013.01); *C09K 8/58* (2013.01)

(58) Field of Classification Search
CPC ............ E21B 43/22; E21B 43/20; C09K 8/58
USPC ............................ 166/400, 272.3, 272.5, 285
See application file for complete search history.

(56) References Cited

U.S. PATENT DOCUMENTS 4,328,864 A * 5/1982 Friedman ...................... 166/400
6,401,819 B1 * 6/2002 Harris et al. .................. 166/300
(Continued)

FOREIGN PATENT DOCUMENTS

| RU | 2066743 C1 | 9/1996 |
| RU | 2250367 C2 | 4/2005 |
| WO | WO-2012/107458 A1 | 8/2012 |

OTHER PUBLICATIONS

Borling et al, "Pushing Out the Oil with Conformance Control" in Oilfield Review (Apr. 1994) pp. 44-51.
(Continued)

*Primary Examiner* — Doug Hutton, Jr.
*Assistant Examiner* — Silvana Runyan
(74) *Attorney, Agent, or Firm* — Drinker Biddle & Reath LLP

(57) ABSTRACT

Mineral oil is produced from underground mineral oil deposits by injecting one or more flooding media into an injection well and withdrawing mineral oil from a production well. Highly permeable zones are blocked in the region between the injection well and the production well by separately injecting, in succession, two different aqueous formulations, one having water and urotropin and the other having water and urea, through the injection well into the deposit. The two different aqueous formulations mix in the formation after injection to form viscous gels. Either or both formulations have at least one further metal or semimetal compound that can form gels when admixed with bases. The injection well temperature is not more than 60° C.

15 Claims, 3 Drawing Sheets

(56) References Cited

U.S. PATENT DOCUMENTS

Figure 1:
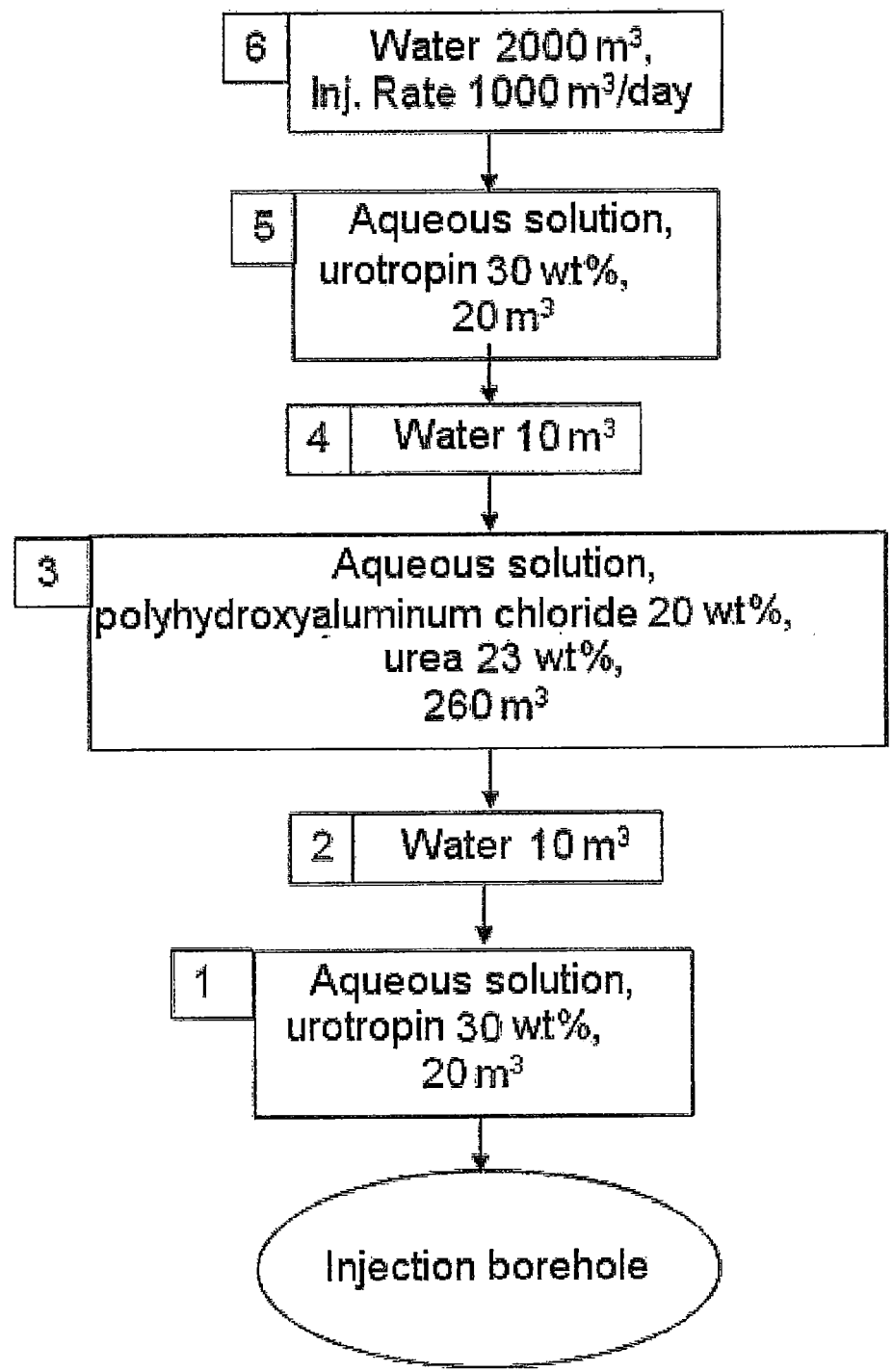

| | | | |
|---|---|---|---|
| 7,273,101 B2 * | 9/2007 | Davies et al. | 166/293 |
| 2011/0088899 A1 | 4/2011 | Stehle | |
| 2012/0080187 A1 | 4/2012 | Stehle | |
| 2012/0138302 A1 | 6/2012 | Stehle | |
| 2012/0199343 A1 | 8/2012 | Stehle | |
| 2012/0255729 A1 | 10/2012 | Stehle | |
| 2012/0325481 A1 | 12/2012 | Stehle | |

OTHER PUBLICATIONS

U.S. Appl. No. 61/524,337, filed Dec. 27, 2011.

* cited by examiner

METHOD OF REDUCING ZONE PERMEABILITY BY IN-SITU FORMATION GEL OF UROTROPIN AND UREA IN AN AQUEOUS SOLUTION

This patent application claims the benefit of U.S. provisional patent application Ser. No. 61/532,126 filed 8 Sep. 2011 incorporated in its entirety herein by reference.

The present invention relates to a process for producing mineral oil from mineral oil deposits, in which the mineral oil yield is increased by blocking highly permeable regions of the mineral oil formation by separate injection of at least two different formulations into the deposit, said formulations not mixing with one another until within the deposit, and the mixture forming highly viscous gels under the influence of the deposit temperature. The process can be used especially in the final stage of deposit development, when watering out in production increases, and particularly after the water flooding of the deposits.

In natural mineral oil deposits, mineral oil occurs in cavities of porous reservoir rocks which are closed off from the surface of the earth by impervious overlying strata. In addition to mineral oil, including proportions of natural gas, a deposit further comprises water with a higher or lower salt content. The cavities may be very fine cavities, capillaries, pores or the like, for example those having a diameter of only approx. 1 μm; the formation may additionally also have regions with pores of greater diameter and/or natural fractures.

After the well has been sunk into the oil-bearing strata, the oil at first flows to the production wells owing to the natural deposit pressure, and erupts from the surface of the earth. This phase of mineral oil production is referred to by the person skilled in the art as primary production. In the case of poor deposit conditions, for example a high oil viscosity, rapidly declining deposit pressure or high flow resistances in the oil-bearing strata, eruptive production rapidly ceases. With primary production, it is possible on average to produce only 2 to 10% of the oil originally present in the deposit. In the case of higher-viscosity mineral oils, eruptive production is generally completely impossible.

In order to enhance the yield, what are known as secondary production processes are therefore used.

The most commonly used process in secondary mineral oil production is water flooding. This involves injecting water through what are known as injection wells into the oil-bearing strata. This artificially increases the deposit pressure and forces the oil out of the injection wells to the production wells. By water flooding, it is possible to substantially increase the yield level under particular conditions.

In the ideal case of water flooding, a water front proceeding from the injection, well should force the oil homogeneously over the entire mineral oil formation to the production well. In practice, a mineral oil formation, however, has regions with different levels of flow resistance. In addition to oil-saturated reservoir rocks which have fine porosity and a high flow resistance for water, there also exist regions with low flow resistance for water, for example natural or synthetic fractures or very permeable regions in the reservoir rock. Such permeable regions may also be regions from which oil has already been recovered. In the course of water flooding, the flooding water injected naturally flows principally through flow paths with low flow resistance from the injection well to the production well. The consequences of this are that the oil-saturated deposit regions with fine porosity and high flow resistance are no longer flooded, and that increasingly more water and less mineral oil is produced via the production well. In this context, the person skilled in the art refers to "watering out of production". The effects mentioned are particularly marked in the case of heavy or viscous mineral oils. The higher the mineral oil viscosity, the more probable is rapid watering out of production.

For production of mineral oil from deposits with high mineral oil viscosity, the mineral oil can also be heated by injecting steam in the deposit, thus reducing the oil viscosity. As in the case of water flooding, however, steam and steam condensate can also strike undesirably rapidly through highly permeable zones from the injection wells to the production wells, thus reducing the efficiency of the tertiary production.

The prior art discloses measures for closing such highly permeable zones between injection wells and production wells by means of suitable measures. As a result of these, highly permeable zones with low flow resistance are blocked and the flood water or the flood steam flows again through the oil-saturated, low-permeability strata. Such measures are also known as "conformance control". An overview of measures for conformance control is given by Borling et al. "Pushing out the oil with Conformance Control" in Oilfield Review (1994), pages 44 ff.

For conformance control, it is possible to use comparatively low-viscosity formulations of particular chemical substances which can be injected easily into the formation, and the viscosity of which rises significantly only after injection into the formation under the conditions which exist in the formation. To enhance the viscosity, such formulations comprise suitable inorganic, organic or polymeric components. The rise in viscosity of the injected formulation can firstly occur with a simple time delay. However, there are also known formulations in which the rise in viscosity is triggered essentially by the temperature rise when the injected formulation is gradually heated to the deposit temperature in the deposit. Formulations whose viscosity rises only under formation conditions are known, for example, as "thermogels" or "delayed gelling systems". However, these formulations are usable efficiently only for deposits whose temperature is above 60° C. For "cold" deposits whose temperature is less than 60° C., formulations which are partly mixed before injection are used, the viscosity of which at first remains low and which do not form components which increase the viscosity of the formulation through chemical reactions until after injection into the deposit.

This group includes formulations comprising urotropin, urea and aluminum salts or other metal salts. Processes for mineral oil production with this group of formulations are disclosed, for example, in RU2066743, RU2250367 and RU2382174. One disadvantage of this process is that the chemical reaction between urotropin, urea and metal salt also sets in at low temperatures above ground even in the course of mixing, and another is that the reaction time within which the formulation forms a viscous gel is comparatively short. The result of this is that a so-called gel bank forms only in the zone close to the injection, but not in zones somewhat further away.

The table below shows, by way of example, the dependence of the gel formation time of an aqueous composition comprising 4% by weight of urotropin, 20% by weight of urea and 17.6% by weight of polyhydroxyaluminum chloride (($Al_nOH)_m$ $Cl_{3n-m}$, AluStar®), 58.4% by weight of water, based on the total weight of the solution, at different temperatures.

TABLE 1

| Temperature [° C.] | Gel formation time measured by rheology [h] | |
|---|---|---|
| | 50% | 90% |
| 20 | 20 | 55 |
| 30 | 5 | 17 |
| 40 | 2 | 6 |
| 50 | 1 | 2 |

50% and 90% mean, respectively, that 50% and 90% of the solution is present as a gel.

Therefore, it is impossible in the case of deposit temperatures of only about 20° C. to pump the mixture based on urotropin, urea and gel-forming metal salt deep into the deposit, since even solutions with gel content 50% are no longer sufficiently mobile, and it typically takes more than one day for the mixture to reach the site in the formation where it is to act. Thus, the formulations injected do not reach the highly permeable zones that they are actually supposed to block at all; instead, viscous gels are formed actually at the injection well or in the zone close to the borehole. The gels can hinder the further pumping of the gel-forming formulation, and can naturally also prevent subsequent water or steam flooding.

It was therefore an object of the present invention to provide a process for producing mineral oil from mineral oil formations, in which watering out of production is reduced and the level of oil recovery rises, and which is also suitable for deposits with relatively low temperature.

This object is achieved by the following process for producing mineral oil from underground mineral oil deposits into which at least one injection well and at least one production well have been sunk, comprising at least the following process steps:
(1) injecting one or more flooding media into at least one injection well and withdrawing mineral oil through at least one production well,
(2) blocking highly permeable zones in the mineral oil deposit in the region between the at least one injection well and the at least one production well, by injecting at least one aqueous formulation $F_1$ and at least one aqueous formulation $F_2$ each separately in succession through the at least one injection well into the deposit, the formulations mixing with one another in the formation after injection to form viscous gels,
(3) continuing the injection of one or more flooding media into the injection well,
wherein
formulation $F_1$ comprises water and urotropin,
formulation $F_2$ comprises water and urea, and
$F_1$ and/or $F_2$ comprise(s) at least one further compound M which is selected from metal compounds and semimetal compounds and is able form gels when admixed with bases,
the injection well temperature before process step (2) being not more than 60° C.

In a preferred embodiment, this object is achieved by the following process for producing mineral oil from underground mineral oil deposits into which at least one injection well and at least one production well have been sunk, comprising at least the following process steps:
(1) injecting one or more flooding media into at least one injection well and withdrawing mineral oil through at least one production well,
(2) blocking highly permeable zones in the mineral oil deposit in the region between the at least one injection well and the at least one production well, by injecting at least one aqueous formulation $F_1$ and at least one aqueous formulation $F_2$ each separately in succession through the at least one injection well into the deposit, the formulations mixing with one another in the formation in a mixing zone after injection to form viscous gels,
(3) continuing the injection of one or more flooding media into the injection well,
wherein
formulation $F_1$ comprises water and urotropin,
formulation $F_2$ comprises water and urea, and $F_1$ and/or $F_2$ comprise(s) at least one further compound M which is selected from metal compounds and semimetal compounds and is able form gels when admixed with bases, the metal compounds and semimetal compounds being selected from Fe(II) and Fe(III) salts, vanadium salts, zirconium salts, aluminum(III) salts and colloidal silicon compounds,
and wherein the concentration of urotropin is at least 1% by weight, the concentration of urea at least 5.75% by weight and the concentration of the at least one compound M at least 5% by weight in the mixing zone of the formulations after step (2), based on the sum of water, urotropin, urea and the at least one compound M present in the mixing zone,
the injection well temperature before process step (2) being not more than 60° C.

The process according to the invention has the advantage that it is also possible to block high-permeability zones in a controlled manner by means of inorganic gels even in deposits with low temperature. The process enables blockage even of cooled (for example by water flooding), washed-out rock zones in the deposit. The distance between the borehole and the gel bank in the process according to the invention can be regulated irrespective of temperature. This achieves efficient blockage of high-permeability zones, reduces watering out of production and increases the level of oil recovery.

INDEX OF FIGURES

Figure 2:
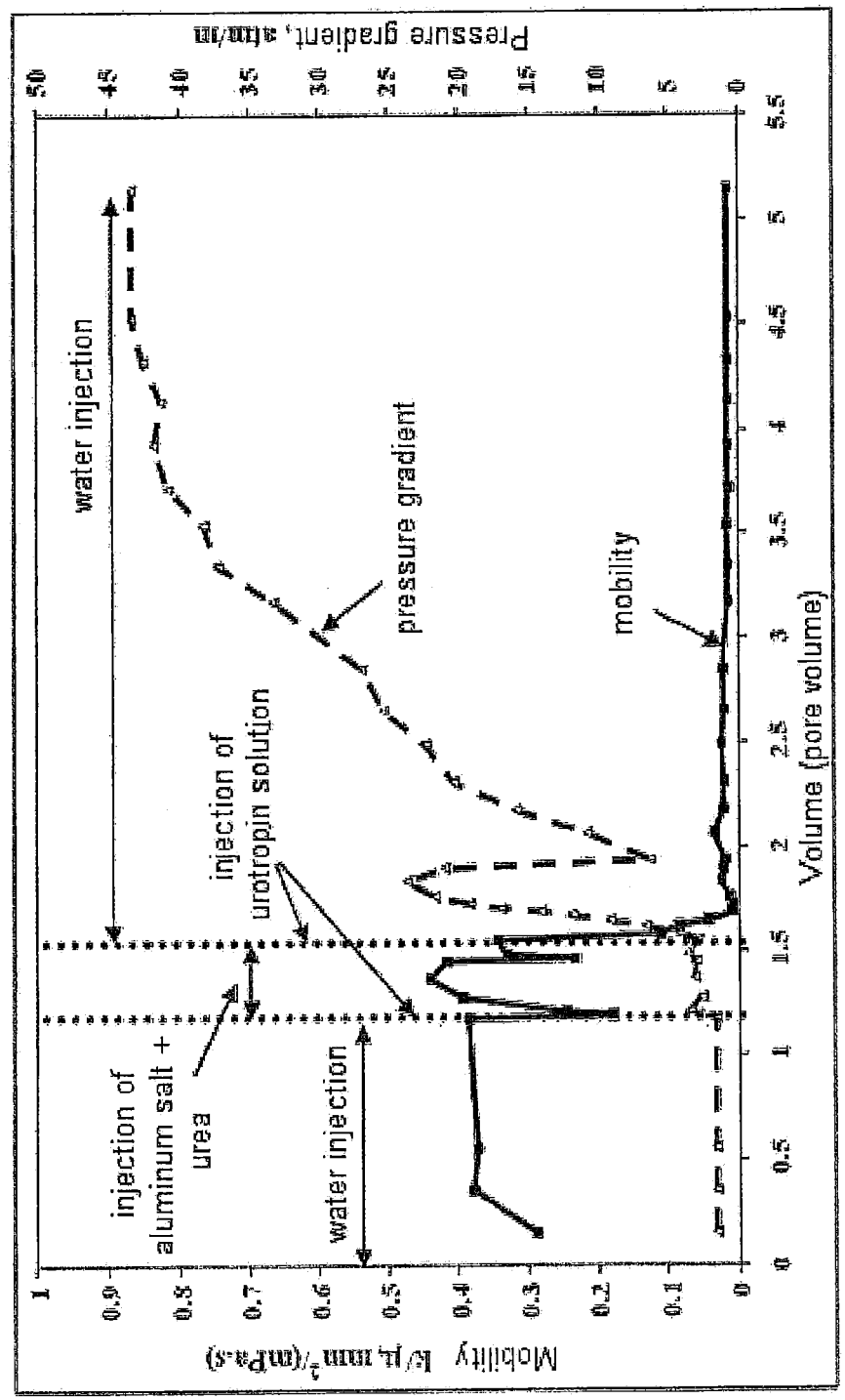
Figure 3:
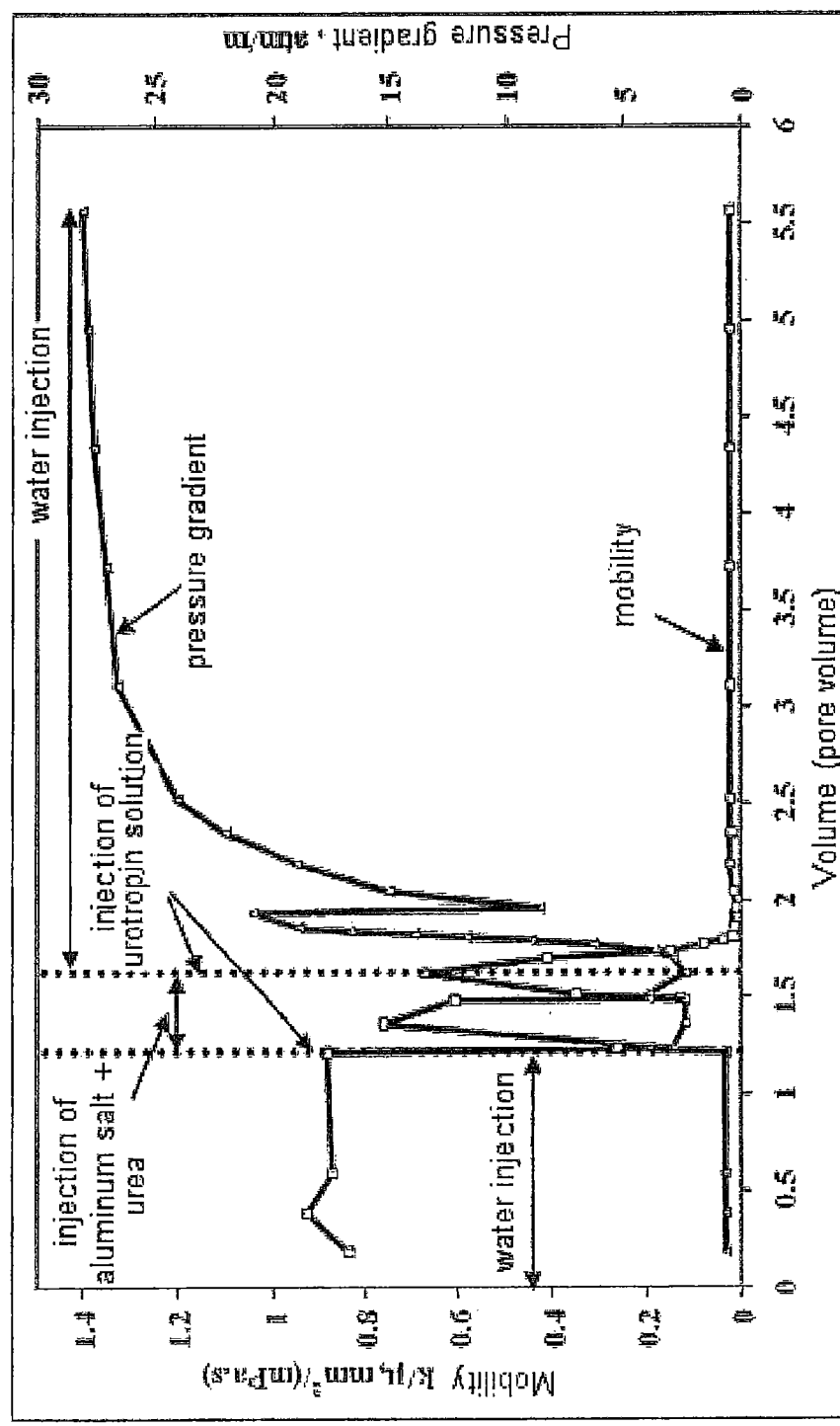

FIG. 1 Illustration of the results of a simulation calculation of the mixing zone after inventive injection of a portion $F_1$, of a portion $F_2$ and of a portion $F_1$;
FIG. 2 Illustration of the pressure plot of the core flooding test according to example 1;
FIG. 3 Illustration of the pressure plot of the core flooding test according to example 2.

With regard to the invention, the following specific details are given:

The process according to the invention for producing mineral oil is a process for secondary or tertiary mineral oil production, which means that it is employed after primary mineral oil production due to the autogenous pressure of the deposit has stopped, and the pressure in the deposit has to be maintained by injecting water and/or steam.

Deposits

The deposits may be deposits for all kinds of oil, for example those for light or heavy oil. In one embodiment of the invention, the deposits are heavy oil deposits, i.e. deposits which comprise mineral oil with an API gravity of less than 22.3° API.

To execute the process, at least one production well and at least one injection well are sunk into the mineral oil deposits. In general, one deposit is provided with several injection wells and with several production wells.

The initial deposit temperature—i.e. the temperature before step (2) of the process according to the invention—is typically 8 to 60° C., preferably 8 to 50° C., more preferably 8 to 40° C., even more preferably 8 to 30° C. and especially 8 to 25° C., measured at the injection well. The deposit temperature changes as a result of the application of the process according to the invention typically at least within the region between the injection wells and the production wells.

Process

According to the invention, the process comprises at least three process steps (1), (2) and (3), which are executed in this sequence, but not necessarily in immediate succession. The process may of course also comprise further process steps which can be executed before, during or after steps (1), (2) and (3).

Process Step (1)

In a first process step, (1), one or more flooding media such as nitrogen, carbon dioxide, water, and water comprising customary additives known to those skilled in the art, such as thickeners and surfactants, preferably water or water comprising additives, are injected into the at least one injection well, and mineral oil is withdrawn through at least one production well. The present invention also provides a process wherein the flooding medium is selected from water optionally comprising additives. The term "mineral oil" in this context does not of course mean single-phase oil; what is meant is instead the typical emulsions which comprise oil and formation water and which are produced from mineral oil deposits.

The water injected typically has a temperature of 5 to 60° C., preferably of 5 to 50° C. and more preferably of 5 to 40° C.

As a result of the injection of water, a zone forms in the region between the injection well and the production well, in which oil is displaced by water.

As a result of the injection of flooding media such as water, the original deposit temperature can change, i.e. it can be increased or lowered according to whether the flooding medium injected has a higher or lower temperature than the original deposit temperature.

As a result of the injection of a flooding medium such as water, the pressure in the deposit rises, and zones form in the region between the injection well and the production well, in which oil is displaced by the flooding medium.

As a result of the natural inhomogeneity of the permeability of the deposit, the "washed-out" zones having high permeability form within a certain time between the injector and producers. These zones may have very different geometries and dimensions and are very difficult to predict. These zones are often arranged at the small geological faults which cannot be discovered by conventional test methods and test instruments, or at particular rock strata.

When watering out of production rises relatively rapidly after commencement of water flooding, this is a clear indication of water breakthrough.

Process Step (2)

Process step (2) can be employed as soon as production becomes excessively watered out, or what is called a water breakthrough is registered. In the event of water breakthrough, water flows through high-permeability zones from the injection well to the production well. High-permeability zones need not, however, necessarily be produced by the water flooding, but may also be present naturally in a formation. In addition, it is possible that permeable zones have already been created in a process step preceding the process according to the invention.

For preparation for process step (2), it may be advantageous to measure the temperature in the region of the injection well and to determine the temperature range of the deposit in the region under the influence of flooding. Methods of determining the temperature range of a mineral oil deposit are known in principle to those skilled in the art. The temperature distribution is generally determined by temperature measurements at particular sites in the formation in combination with simulation calculations, the simulation calculations taking account of factors including amounts of heat introduced into the formation and the amounts of heat removed from the formation. Alternatively, each of the regions can also be characterized by its average temperature. It is clear to the person skilled in the art that the analysis of the temperature range outlined constitutes merely an approximation of the actual conditions in the formation.

Process step (2) can be performed immediately after process step (1).

In the course of process step (2), high-permeability zones of the mineral oil deposit in the region between the injection wells and the production wells are blocked by injecting aqueous formulations through the at least one injection well.

According to the invention, at least two different aqueous formulations $F_1$ and $F_2$ are used for this purpose. Formulation $F_1$ comprises water and urotropin (hexamethylenetetramine). The different formulation $F_2$ comprises water and urea. In addition, either $F_1$ or $F_2$, or both $F_1$ and $F_2$, comprise(s) at least one compound M selected from metal compounds and semimetal compounds which can form gels when admixed with bases.

To execute the process, the at least two formulations $F_1$ and $F_2$ are each injected separately into the deposit through one or more injection wells. The injection wells are typically the same as were used in process step (1) for Injection of water or steam.

The injection is undertaken in such a way that the two formulations mix in the formation after injection.

Formulations $F_1$ and $F_2$

According to the invention, formulations $F_1$ and $F_2$ are composed in terms of their components such that they form viscous gels after mixing underground under the influence of the deposit, even at temperatures of at most 60° C., whereas the separate, unmixed formulations $F_1$ and $F_2$ cannot form gels even at relatively high temperatures (for example 50° C.). The viscous gels formed after mixing block cavities in the mineral oil formation and thus block flow paths for water and/or steam. According to the invention, the gels are inorganic gels, especially hydroxides or oxide hydrates of metals or semimetals.

The at least one further compound M can form gels when admixed with base. It is selected from metal compounds and semimetal compounds which can form gels when admixed with base. These may be selected, for example, from Fe(II) and Fe(III) salts, vanadium salts, zirconium salts, aluminum (III) salts and colloidal Si compounds. In a preferred embodiment of the invention, the at least one further compound M is selected from water-soluble aluminum(III) salts.

The water-soluble aluminum(III) salts are preferably selected from aluminum nitrate, aluminum chloride, aluminum sulfate, aluminum acetate, aluminum acetylacetonate, partly hydrolyzed derivatives thereof and mixtures thereof. Partly hydrolyzed derivatives of the aluminum(III) salts mentioned above include, for example, aluminum hydroxychloride.

The pH of that formulation $F_1$ and/or $F_2$ which comprises the at least one further compound M selected from water-soluble aluminum(III) salts is typically ≤5, preferably ≤4.5 and more preferably ≤4.

The colloidal Si compounds are preferably colloidal $SiO_2$, which should advantageously have an average particle size of 4 nm to 300 nm. The specific surface area of the $SiO_2$ may, for example, be 100 to 300 $m^2/g$.

When the formulations are mixed, the following chemical reactions take place:

$$(CH_2)_6N_4 + 10H_2O \rightleftharpoons 6CH_2O + 4NH_4OH \quad (a)$$

$$CO(NH_2)_2 + CH_2O \rightarrow \text{urea-formaldehyde resin} + H_2O \quad (b)$$

$$\text{compound M (for example } Al_n(OH)_mCl_{3n-m}) + NH_4OH \rightarrow \text{inorganic gel (for example } Al(OH)_3) + NH_4Cl \quad (c)$$

The chemical reaction between formaldehyde and urea (reaction equation (b)) causes the equilibrium of the urotropin hydrolysis (reaction equation (a)) to shift in the direction of formaldehyde/ammonium hydroxide. This means that the hydrolysis level of the urotropin rises in the presence of urea and, as a result, also the amount of ammonium hydroxide. Ammonium hydroxide reacts with compound M (for example polyhydroxyl-chloride aluminum (Alustar® 1010 L)) and forms a gel (aluminum hydroxide) and water-soluble salt (ammonium chloride) (reaction equation (c)). If only urotropin and aluminum salt are present, and not urea, no gel formation takes place, as shown in example 1. The same applies when urea and aluminum salt are present, but urotropin is absent.

As well as water, the formulations may optionally also comprise further water-miscible organic solvents. Examples of such solvents comprise alcohols. In general, formulations $F_1$ and $F_2$ (F) should, however, comprise at least 80% by weight of water based on the sum of all solvents in the formulation, preferably at least 90% by weight and more preferably at least 95% by weight. Most preferably, only water should be present.

Formulations $F_1$ and/or $F_2$ may additionally comprise further components which can accelerate or slow gel formation. Examples thereof comprise further salts or naphthenic acids. In addition, formulations $F_1$ and/or $F_2$ may also comprise thickening additives, for example thickening polymers.

After formulations $F_1$ and $F_2$ have been mixed, the increase in the pH results in formation of high-viscosity, water-insoluble gels which comprise metal ions, hydroxide ions and possibly further components. In the case of use of aluminum compounds, an aluminum hydroxide or aluminum oxide hydrate gel may form, which may of course also comprise further components, for example the anions of the aluminum salt(s) used.

Preferably, in formulation $F_1$, the urotropin is used in an amount of 6 to 32% by weight, preferably 15 to 25% by weight, based on the sum of all components of formulation $F_1$.

Likewise preferably, the urea is used in formulation $F_2$ in an amount of 16 to 36% by weight, preferably 20 to 30% by weight, based on the sum of all components of formulation $F_2$.

If the at least one further compound M is added only to formulation $F_1$ or only to formulation $F_2$, the concentration of the at least one compound M is typically 4 to 8% by weight, based on the total weight of formulation $F_1$ or $F_2$ and based on the anhydrous compound.

When the at least one compound M is present both in formulation $F_1$ and in $F_2$, the concentration of the at least one compound $F_1$ in the two formulations is typically selected such that the total concentration of M, based on $F_1$ and $F_2$, is 2 to 4% by weight.

The concentration of urea and of urotropin should be such that a sufficient amount of base can form to lower the pH to such an extent that a gel can indeed precipitate out.

In the case of aluminum, the amount of urea and urotropin should therefore at least be such that 3 mol of base are released per mole of Al(III).

Via the concentration of the components, it is in principle also possible to determine the time until gel formation after mixing, though it should be considered that the mixing of formulations $F_1$ and $F_2$ in the formation is not necessarily complete, and that a certain inaccuracy correspondingly exists in the setting of gel formation times. The higher the concentration of the urea and of the urotropin, the greater—for a given concentration of the metal compound—the rate of gel formation. This relationship can be used by the person skilled in the art to extend or to shorten the gel formation time in a controlled manner.

Performance of Process Step (2)

According to the invention, the at least two formulations $F_1$ and $F_2$ are each injected separately into the deposit through one or more injection wells, and the formulations do not mix until underground. The injection of formulations $F_1$ and $F_2$ is generally followed by subsequent flooding with water in order to displace formulations $F_1$ and $F_2$ further into the deposit. In the context of the present invention, subsequent flooding refers to the volume of water which is injected directly after the injection of formulations $F_1$ and $F_2$ in order to bring formulations $F_1$ and $F_2$ to the desired sites underground, and to achieve maximum mixing of formulations $F_1$ and $F_2$. If subsequent flooding is stopped too early, it may be the case that $F_1$ and $F_2$ do not come into contact sufficiently with one another, if at all. If subsequent flooding proceeds for too long, gel formation in the mixing zone is disrupted. After subsequent flooding, flooding is typically stopped for 1-3 days.

Frequently, a portion of water is injected between an injection of formulations $F_1$ and $F_2$ or $F_2$ and $F_1$. This portion of water injected between two portions of formulations $F_1$ and $F_2$ is also referred to hereinafter as buffer water. The volume of water injected should not be greater here, and should preferably be less, than the volume of the subsequently injected portion of $F_1$ or $F_2$. The volume of the formulation $F_1$ is abbreviated to $V_{F1}$, the volume of the formulation $F_2$ to $V_{F2}$. In general, the volume of formulation $F_1$ or of the portion of $F_1$ injected in each case is less than the volume of formulation $F_2$ or of the injected portion of $F_2$. The volume of the buffer water injected between formulations $F_1$ and $F_2$ or $F_2$ and $F_1$ is guided typically by the smaller volume. The volume of the buffer water is preferably at least 1 m³, especially 1 m³ to $V_{F1}$, where $V_{F1}$ is the volume of formulation $F_1$ which has just been injected beforehand. The volume of such a portion of buffer water may especially be 40% to 100% of the injected portion comprising urotropin (formulation $F_1$), preferably 40 to 80% and more preferably 40 to 60%.

The present invention also provides a process in which the viscosity of the buffer water is increased by adding one or more additives before injection.

In addition, the present invention also provides a process in which the total volume of the buffer water injected is less than the total volume of the formulations $F_1$ and $F_2$ injected.

In addition, the present invention provides a process in which subsequent flooding is effected using water whose viscosity has been increased by adding one or more additives.

In addition, the present invention provides a process in which the densities of the aqueous formulations $F_1$ and $F_2$, of any buffer water injected and of the water for subsequent flooding are balanced out using glycerol.

The present invention thus also provides a process in which $V_{F1} \leq V_{F2}$.

In addition, the present invention thus also provides a process in which the volume ratio $V_{F2}:V_{F1}$ lies in the range from 10 000:1 to 1:1, preferably in the range from 1000:1 to 1:1, more preferably a range from 100:1 to 1:1 and especially in the range from 10:1.

The total volume of formulations $F_1$ and $F_2$ injected ($V_{F1}+V_{F2}$) depends on the geological properties of the mineral oil deposit and may vary within wide ranges.

The total volume ($V_{F1}+V_{F2}$) is generally in the range from 500 to 5 m$^3$, preferably in the range from 200 to 10 m$^3$ and especially in the range from 100 to 20 m$^3$.

The formulations should not mix with one another until after they have flowed through the zone close to the injection well, in order that they actually reach the high-permeability zones in the mineral oil formation and do not form gels at too early a stage.

Use of analytical models and simulation models known to those skilled in the art determines the desired distance of the mixing zone from the injector. This distance can be regulated within a certain range by the variation of the volumes of the portions of formulations $F_1$ and $F_2$, and optional injection of different volumes of buffer water.

On injection of the portions of formulations $F_1$ and $F_2$, and optionally of buffer water, and on subsequent flooding with water, the concentration of urotropin, urea and compound(s) M in the formulations decreases to an increasing extent as a result of addition of formation water and flooding water. The degree to which the concentration is reduced can be predicted on the basis of laboratory studies and mathematical models. Thus, the concentration of the chemical components before the injection of formulations $F_1$ and $F_2$ is adjusted such that the concentration of urotropin in the deposit zone in which the formulations mix is at least 1% by weight, the concentration of the compound(s) M is at least 5% by weight and the concentration of the urea is at least 5.75% by weight, based on the total amount of the solutions present in the mixing zone and of the water.

Preferably in accordance with the invention, before the injection of formulations $F_1$ and $F_2$, the three-dimensional position of the mixing zone of the formulation portions in the deposit is determined, and the volume for the subsequent flooding is determined on this basis. In most cases, the calculation of the optimal volumes of $F_1$ and $F_2$ and the determination of the three-dimensional position of the mixing zone of the formulation portions is possible only as an approximation. Consequently, in the case of serial pumping of the portions, the subsequent flooding (water injected before flooding is stopped) is conducted at low rates (volume of flooding medium per unit time) and, after occurrence of the first signs of an increase in flooding pressure, flooding is stopped. The "mixing zone of the formulation portions" refers to the deposit zone in which the formulations mix. The three-dimensional position of the mixing zone is understood to mean the extent of the deposit zone in which the formulations mix, and the distance of this zone from the injection well through which subsequent flooding is effected. The mixing of formulations $F_1$ and $F_2$ will typically take place not far from the injector (max. 10-15 meters), since the dilution of $F_1$ and $F_2$ has a logarithmic dependence on the distance from injector. An important advantage of the process is that it is virtually ruled out even at low injection rates that gelation commences directly in the injector. Known processes in which urotropin solutions, which gelate very rapidly, are used do not have this advantage.

Formulations $F_1$ and $F_2$ can be injected in different sequences. It is possible first to inject a formulation $F_1$ and then a formulation $F_2$. It is also possible to inject at least two portions of formulation $F_1$ and at least two portions of formulation $F_2$ alternately into the deposit. It is also possible first to inject a portion of formulation $F_1$, then a portion of formulation $F_2$ and subsequently a further portion of formulation $F_1$.

The measures which follow have been found to be useful for achieving substantially complete mixing of formulations $F_1$ and $F_2$.

Typically, the volume of the buffer solution injected is at least 1 m$^3$ and at most 50 m$^3$, but should not exceed the volume $V_F$, where $V_F$ is the volume of formulation $F_1$ or $F_2$ which has just been injected beforehand.

Preferably, the total volume of the buffer water injected is less than the total volume of the formulations $F_1$ and $F_2$ injected.

Preferably in accordance with the invention, the buffer water viscosity is increased by adding additives before injection into the deposit. The additives used may be different organic and inorganic compounds, for example water-soluble PAM (polyacrylamide), biopolymers such as xanthan, inter alia.

These additives can also be used to thicken formulations $F_1$ and $F_2$. The increase in viscosity avoids rapid mixing of formulations $F_1$ and $F_2$.

In a preferred embodiment, first a portion of formulation $F_1$ and then a portion of formulation $F_2$ are injected. Between these portions, buffer water is injected into the deposit. The volume of the buffer water may vary between 1 m$^3$ and 50 m$^3$, but it should not exceed the volume of a portion of the urotropin-water solution ($F_1$). This is followed by subsequent flooding with water, the volume of the water used for subsequent flood being Vn. After the injection of Vn, the two portions of formulations $F_1$ and $F_2$ reach the zone in which they mix to the maximum degree.

In order not to disrupt gel formation by shear stresses, the subsequent water flooding is stopped for 1-3 days and then restarted. This measure is suitable in accordance with the invention for all embodiments, in order to promote gel formation.

In a further preferred embodiment, three portions of formulations selected from $F_1$ and $F_2$ are injected into the deposit, the first and last portion being selected from $F_1$ and a portion of formulation $F_2$ being injected inbetween. Between the individual portions, buffer water can be injected into the deposit.

In a further preferred embodiment, more than three portions of formulations selected from $F_1$ and $F_2$ are injected alternately into the deposit, the first and last portions of formulation being selected from $F_1$. Between the individual portions, buffer water can be injected into the deposit.

It is generally advantageous, after injection of formulations $F_1$, $F_2$ and the subsequent flooding water, to inject no flooding medium into the at least one injection well for one to three days, in order not to disrupt gel formation in the deposit. It is especially preferred, in the course of subsequent flooding, to continuously measure the pressure on injection of the water used for subsequent flooding and, after the pressure has risen by about 2 to 5%, not to inject any flooding medium into the at least one injection well for one to three days. The pressure rise shows the commencement of gel formation, which can then proceed without disruption.

In a further preferred embodiment, first a formulation $F_1$ and then at least one formulation $F_2$ is injected. In this embodiment, formulation $F_1$ comprises a viscosity-increasing additive, for example a water-soluble thickening polymer, in such an amount that the viscosity of formulation $F_1$ under deposit conditions is somewhat greater than that of formulation $F_2$ injected thereafter. Examples of such polymers comprise polyacrylamide, microgels based on polyacrylamide, or biopolymers. The slightly higher viscosity makes the flow rate of the first injected portion of formulation $F_1$ in the formation somewhat lower than that of the subsequently injected formulation $F_2$. Formulation $F_2$ can accordingly penetrate particularly well into the flowing front of formulation $F_1$ and mix therewith. In general, the viscosity of the injected formulation $F_1$ should not be more than 30%, for example 10% to 30%, higher than the viscosity of formulation $F_2$ injected later.

In a further preferred embodiment, the portions of aqueous formulations $F_1$ and $F_2$, buffer water and subsequent flooding water (water for displacement of formulations $F_1$ and $F_2$) are prepared with the same density. This prevents flooding portions having different densities from taking different routes when pumped into the productive geological stratum and not coming into proper contact with one another. When, for example, the urotropin solution (10% by weight) is prepared using fresh water, the solution density is 1.03 g/cm³, the density of the urea solution with aluminum salt being 1.10 g/cm³. When the buffer water, for example, has a higher density (formation water density up to 1.2-1.3 g/cm³) than formulations $F_1$ and $F_2$, temporal separation of the portions of formulations $F_1$ and $F_2$ in the productive geological stratum is more difficult. This is also true of the subsequent flooding water. The density of the flooding portions is balanced out by addition of salts, preferably selected from NaCl and $CaCl_2$, salt-containing formation water (accompanying water), or glycerol. It is possible to use crude glycerol, which is a by-product in biodiesel production and is readily soluble in water. Salt-containing formation water can also be used for production of formulations $F_1$ and $F_2$.

In the production of biodiesel from rapeseed oil, the by-product obtained is glycerol (crude glycerol). For instance, 10 l of oil and 1 l of methanol with addition of reagents give about 10 l of biodiesel and 1 l of glycerol. Glycerol ($C_3H_5(OH)_3$) is a trihydric alcohol. The slightly viscous, water-soluble, odorless liquid comprises approx. 85 to 90% dry mass. Depending on the water content and temperature, the density of crude glycerol is 1.1 to 1.3 g/cm³.

Data and properties of crude glycerol:
glycerol content 80-82%
water content 10-15%
NaCl 5-7%
methanol 0.01-0.5%
density 1.23-1.27 g/cm³ at 20° C.
ecological information—biodegradable.

Crude glycerol is miscible with urotropin solution and with urea solution.

As mentioned above, the density of formulations $F_1$ and $F_2$, of the buffer water and of the subsequent flooding water can also be modified by addition of salt. For example, for an aqueous solution with 24% by weight of NaCl the density of the solution is 1.184 g/l, and for an aqueous solution of 20% by weight of $CaCl_2$ the density of the solution is 1.179 g/l.

Typically, injection of the last portion of formulation, which may be selected from $F_1$ and $F_2$, is followed by subsequent flooding with water before performance of step (3). The water used here may have increased viscosity by virtue of addition of one or more additives. Suitable additives are the compounds already mentioned above for this purpose for formulations $F_1$, $F_2$ and the buffer water.

Process Step (3)

After process step (2), oil production is continued in process step (3) through at least one production well. This can be done immediately thereafter, or else optionally after a short break, for example a break of 1 to 3 days.

Preferably, the oil production can be effected by customary methods, by injection of one or more flooding media through at least one injection well into the mineral oil deposit, and withdrawal of crude oil through at least one production well. The flooding medium may especially be selected from the flooding media listed as suitable for step (1). Preference is given to using water and/or water comprising additives as the flooding medium. The at least one injection well may be the injection wells already used for injection of formulations $F_1$ and $F_2$, or else other injection wells in suitable arrangement.

The oil production can, however, of course also be continued by means of other methods known to those skilled in the art. For example, the flooding media used may also be viscous solutions of silicate-containing products or thickening polymers. These may be synthetic polymers, for example copolymers comprising polyacrylamide or acrylamide. In addition, they may also be biopolymers, for example particular polysaccharides.

It is of course possible, after process step (3), to perform process steps (2) and (3) once again. This can be done at regular intervals, for example once per year or as soon as water breakthrough is registered. More particularly, step (2) is repeated when critical watering out of production is attained in the mineral oil production in step (3). This stage is typically reached when watering out of production is more than 70-90%.

According to the invention, "critical watering out of production" is understood to mean a water content of the mineral oil withdrawn from the at least one production well of more than 70% by weight, preferably more than 90% by weight, based in each case on the total weight of the mineral oil withdrawn from the at least one production well.

As already explained above, the term "mineral oil" is understood to mean not single-phase oil but typically an emulsion composed of oil and formation water. Critical watering out of production has occurred when the mineral oil produced comprises more than 70% by weight, preferably more than 90% by weight, of formation water, based in each case on the total weight of the emulsion withdrawn from the at least one production well.

Advantages

The process according to the invention for oil production has the following advantages compared to known technologies:

It is possible even in a deposit with a temperature of at most 60° C. to reduce the permeability of the high-permeability zones.

It is possible to operatively block the high-permeability channels in the deposit on water breakthrough, even at a relatively great distance from the injection well.

The process according to the invention prevents gel formation in the injection well and thus increases reliability in oil production.

The process according to the invention is inexpensive, does not need any new chemical products for the implementation, is based on the use of conventional technical means, and allows efficient profile modification even in cold or cooled carriers/deposits.

The invention is illustrated in detail hereinafter by the working examples which follow:

EXAMPLE 1

For one example, the rheological properties of formulations $F_1$, $F_2$ and of the mixture of formulations $F_1$ and $F_2$ were determined. The samples were equilibrated at 20° C. and at 50° C. in a heating cabinet. The concentration figures are each based on the overall formulation/mixture. The $AlCl_3$ was used in the form of a solution of polyaluminum chloride in water which is available under the Alustar® 1010 product name from Applied Chemicals. The results are shown in table 2.

TABLE 2

| | Components | % by wt. | Viscosity η before equilibration [mPa·s] | Temperature 20° C. Gel formation time $t_{gel}$ [days] | η [mPa·s] | 50° C. $t_{gel}$ [days] | η [mPa·s] |
|---|---|---|---|---|---|---|---|
| F1 | urotropin | 16.0 | 1.3 | 100 | no gel formation | 27 | no gel formation |
| | water | 84.0 | | | | | |
| F2 | urea | 32.0 | 2.5 | 100 | no gel formation | 27 | no gel formation |
| | $AlCl_3$ | 8.0 | | | | | |
| | water | 60.0 | | | | | |
| F1 + F2 mixture in a ratio of 1:1 | urea | 16.0 | 2.0 | 3 | 6960 | 1 | 4980 |
| | $AlCl_3$ | 4.0 | | | | | |
| | urotropin | 8.0 | | | | | |
| | water | 72.0 | | | | | |

EXAMPLE 2

Employment of the Process in an Oil Field

The deposit is a typical deposit containing mineral oil having a viscosity of 150-180 cP. A section of the deposit is provided with an injection well and several production wells and is flooded with water for several years. In some production wells which communicate with the injection well, watering out of production is registered. The deposit is fissured by geological faults and has inhomogeneous permeability.

Pumping Scheme

In order to conduct the profile modification and to block the high-permeability zones in the oil-bearing stratum, a first portion of formulation $F_1$ (30% by weight of urotropin in water) is made up in a vessel above ground. It is possible to use fresh water, salt water or formation water. Using customary equipment, 20 m³ of formulation $F_1$ are injected and pressed into the deposit through the injection well. The first portion of formulation $F_1$ has a low viscosity and flows predominantly through the high-permeability regions of the deposit.

Subsequently, 10 m³ of water are injected into the deposit. The injection of the 10 m³ of water mobilizes the first portion of formulation $F_1$ and forces it from the injection well into the mineral oil deposit.

After the water, 260 m³ of a formulation $F_2$ (20% by weight of aluminum(III) chloride (ALUSTAR®) and 23% by weight of urea in water) are injected through the injection well. Subsequently, approx. 10 m³ of water are injected and, immediately thereafter, another 20 m³ of the abovementioned formulation $F_1$. Thus, a total of 260 m³ of $F_2$ and 40 m³ of $F_1$ are pumped in.

The sequence of the individual injections is shown schematically in FIG. 1.

As a result of these measures, the mixing of formulations $F_1$ and $F_2$ forms at least one "bank" composed of formulations $F_1$ and $F_2$ and displacing water in the oil-bearing stratum. In the mixed formulations $F_1$ and $F_2$, the chemical reactions shown above take place and lead to gel formation. On displacement of the formulation banks, there is firstly retention (adsorption) of urotropin, urea and aluminum salt in the rock, and secondly dilution, which leads to a reduction in concentration of the gel-forming substances in the formulation banks.

Calculation/Simulation of Gel Formation

The simulation was conducted using the pumping scheme described above.

The Formulae and Input Data

The dynamic concentration of the aqueous solution in a portion $F_1$ or $F_2$ can be described by the following formula:

$$K(L) = A_1 \times L \times e^{(-A2 \times L)} \quad (1)$$

L: distance between the front of the solution (a portion) and the injector;
$A_1$ and $A_2$ variables which define the nature of the function.

In the analytical calculation, the following input parameters were used:
flooding rate: 1000 m³/day;
porosity of the deposit stratum: 30%
max. permissible dilution of formulation $F_2$ in the productive layer: 25% (four times less than the original concentration);
minimum concentration after max. permissible dilution of the urotropin solution $F_1$=3.3% (original concentration 30%);
effective thickness of the productive stratum: 15 m;
volume of the first portion ($F_1$, urotropin): 20 m³;
volume of the second portion ($F_2$, urea and $AlCl_3$): 260 m³;
volume of the third portion ($F_1$, urotropin): 20 m³;
volume of the buffer water portions (injected in each case between portions $F_1$, $F_2$ and $F_1$ again): 10 m³;
linear coefficient which defines the widening of the zone filled with aqueous solution (portion X of $F_1$, $F_2$): kdiff=0.1

The widening of the zone filled with aqueous solution (portion X) can be defined in the simplest case by the following formula:

$$W = \text{kdiff} \times L = 0._1 \times L$$

Calculations and Graphs

According to the calculations, the optimal period of subsequent flooding with water in the present case is 2 days, which corresponds to a volume of water of 2000 m³ at injection rates of 1000 m³/day. In the case of homogeneous permeability of the flooded deposit stratum (ideal case), a ring-like gel bank of width 1 m is formed at a distance of 11 to 12 m from the injection well. The proportion of the urea-$AlCl_3$ solution mixed with urotropin ($F_1$) is 89% of the total volume of $F_2$ injected.

The dependence of the degree of mixing of portions $F_1$ and $F_2$ on the period of subsequent flooding is defined by the proportion of formulation $F_2$ mixed with $F_1$ (urotropin solution) in the total volume $F_2$ injected. The limiting parameter is the degree of dilution of the urea-$AlCl_3$ solution in the mixing zone. The upper limit is the fourfold dilution of the urea- $AlCl_3$ solution. According to calculations, the maximum degree of mixing of the three portions of aqueous formulations is attained two days after commencement of subsequent flooding with water. Even during subsequent flooding with water, the concentration of urea and $AlCl_3$ in the optimal mixing zone still exceeds the minimum concentration for gel formation; therefore, gel formation in the oil-bearing stratum is guaranteed.

The reduction in the ring width caused by the radial expansion of the aqueous formulations is partly compensated for by the increase in volume of the formulations due to dilution.

By means of the volumes of the injected portions of formulations $F_1$ and $F_2$, and of the amount of water in the subsequent flooding, the distance between the injection well and the gel bank can be regulated.

When gelation commences, the injection pressure also rises. After commencement of the rise in injection pressure, the water flooding is stopped for one to three days. Thereafter, water flooding is restarted. After high-permeability regions have been blocked, new flow paths form in further regions of the oil-bearing stratum under the influence of the flooding medium, and thus further mineral oil is produced from the formation.

EXAMPLE 3

Laboratory Studies—Core Flooding Test

The process according to the invention was tested by means of a model test. For this purpose, loose deposit material of the oil-bearing stratum of a mineral oil deposit in North-Western Germany was pressed in a tube.

In the first model test, the permeability of the material was 0.443 darcy ($0.443*10^{-12}$ m$^2$). The filled tube was provided at the ends with devices for injection and withdrawal of liquids and was heated to 40° C. by means of a heater. As the first step, fresh water was injected into the tube and withdrawn at the other end, in an amount of 4 times the pore volume. Thereafter, a formulation $F_1$ was injected (solution of 30% by weight of urotropin in water, amount injected corresponds to 0.017 times the pore volume), then a portion of water (0.017 times the pore volume), then a formulation $F_2$ (mixture of 20% by weight of an aqueous solution of polyaluminum chloride ($Al_n(OH)_mCl_{3n-m}$, Al content 9.15% by weight, pH<1, ALUSTAR® 1010 L (from Applied Chemicals)) and 23% by weight aqueous solution of urea, remainder: water, amount injected corresponds to 0.243 times the pore volume), then another portion of water (0.017 times the pore volume) and another portion of formulation $F_1$ (0.017 times the pore volume). After a break for 18 hours at a constant temperature of 40° C., water flooding was continued.

The results of the test are shown in FIG. 2. FIG. 2 shows the volume injected, based on the pore volume of the sample (deposit material), and, as a function thereof, the mobility and the pressure gradient. During the water flooding, at the start, the pressure gradient is at first low. However, it rises steeply from 0.07 bar/m ($0.07*10^5$ Palm) to from 20 to 43 bar/m (20 to $43*10^5$ Pa/m) once formulations $F_1$ and $F_2$ have each been fully injected. Thus, the aims of "conformance control" have been achieved.

EXAMPLE 4

In the second model test, the permeability of the material was 1.415 darcies ($1.415*10^{-12}$ m$^2$). The same amounts of $F_1$, $F_2$ and water portions with the same concentrations as described above were injected. The results of the test are shown in FIG. 3, analogously to FIG. 2. The serial injection of formulations $F_1$ and $F_2$ causes the pressure gradient to rise from 0.05 to from 10 bar/m to 27 bar/m (10 to $27*10^5$ Pa/m) once formulations $F_1$ and $F_2$ have each been fully injected and have mixed in the core. Thus, the aims of "conformance control" have been achieved.

The invention claimed is:

1. A process for producing mineral oil from underground mineral oil deposits into which at least one injection well and at least one production well have been sunk, comprising at least the following process steps:
   (1) injecting one or more flooding media into at least one injection well and withdrawing mineral oil through at least one production well,
   (2) blocking highly permeable zones in the mineral oil deposit in the region between the at least one injection well and the at least one production well, by injecting at least one aqueous formulation $F_1$ and at least one aqueous formulation $F_2$ each separately in succession through the at least one injection well into the deposit, the formulations mixing with one another in the formation in a mixing zone after injection to form viscous gels,
   (3) continuing the injection of one or more flooding media into the injection well,
   wherein
   formulation $F_1$ comprises water and urotropin,
   formulation $F_2$ comprises water and urea, and $F_1$ or $F_2$ comprise at least one further compound M which is selected from the group consisting of metal compounds and semimetal compounds and is able to form gels when admixed with bases, the metal compounds and semimetal compounds being selected from Fe(II) and Fe(III) salts, vanadium salts, zirconium salts, aluminum(III) salts and colloidal silicon compounds,
   wherein the separate unmixed formulations $F_1$ and $F_2$ cannot form gels even at 50° C.,
   and wherein the concentration of urotropin is at least 1% by weight, the concentration of urea is at least 5.75% by weight and the concentration of the at least one compound M is at least 5% by weight in the mixing zone of the formulations after step (2), based on the sum of water, urotropin, urea and the at least one compound M present in the mixing zone,
   the injection well temperature before process step (2) being not more than 60° C.

2. The process according to claim 1, wherein the concentration of urotropin in formulation $F_1$ is 6 to 32% by weight, based on the total weight of formulation $F_1$.

3. The process according to claim 1, wherein the concentration of urea in formlation $F_2$ is 16 to 36% by weight, based on the total weight of formulation $F_2$.

4. The process according to claim 1, wherein the concentration of the at least one further compound M in formulation $F_1$ or $F_2$ is 4 to 8% by weight, based in each case on the total weight of formulation $F_1$ or $F_2$ and based on the anhydrous compound.

5. The process according to claim 1, wherein the at least one further compound M is selected from the group consisting of water-soluble aluminum(III) salts and colloidal Si compounds.

6. The process according to claim 5, wherein the water-soluble aluminum(III) salts are selected from the group consisting of aluminum nitrate, aluminum chloride, aluminum sulfate, aluminum acetate, aluminum acetylacetonate, partly hydrolyzed derivatives thereof and mixtures thereof.

7. The process according to claim 5, wherein the colloidal Si compounds are colloidal $SiO_2$.

8. The process according to claim 1, wherein at least three portions in total of formulations selected from $F_1$ and $F_2$ are injected alternately in step (2), the first and last portion injected being selected from $F_1$.

9. The process according to claim 1, wherein a portion of buffer water is injected in step (2) between the injection of formulations $F_1$ and $F_2$ and the injection of formulations $F_2$ and $F_1$.

10. The process according to claim 1, wherein the aqueous formulations $F_1$ and $F_2$, any buffer water injected and the water for subsequent flooding have the same density.

11. The process according to claim 10, wherein the densities of the aqueous formulations $F_1$ and $F_2$, of any buffer water injected and of the water for subsequent flooding are balanced out using salts selected from the group consisting of NaCl and $CaCl_2$ and salt-containing formation water.

12. The process according to claim 1, wherein step (2) is repeated when critical watering out of production is attained in the mineral oil production in step (3).

13. The process according to claim 1, wherein no flooding medium is injected into the at least one injection well for 1 to 3 days after the subsequent flooding.

14. The process according to claim 1, wherein $F_1$ and $F_2$ comprise the at least one further compound M which is selected from the group consisting of metal compounds and semimetal compounds and is able to form gels when admixed with bases, the metal compounds and semimetal compounds being selected from Fe(II) and Fe(III) salts, vanadium salts, zirconium salts, aluminum(III) salts and colloidal silicon compounds.

15. The process according to claim 1, wherein a portion of buffer water is injected in step (2) between the injection of formulations $F_1$ and $F_2$ or the injection of formulations $F_2$ and $F_1$.

* * * * *